(12) United States Patent
Kianush

(10) Patent No.: US 6,370,368 B1
(45) Date of Patent: Apr. 9, 2002

(54) GLOBAL TUNER

(75) Inventor: Kaveh Kianush, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/240,569

(22) Filed: Jan. 29, 1999

(30) Foreign Application Priority Data

Jan. 29, 1998 (EP) .............................................. 98200257

(51) Int. Cl.$^7$ .............................. H04B 7/00; H04B 1/06
(52) U.S. Cl. ................ 455/264; 455/150.1; 455/196.1; 455/255; 455/264; 331/179
(58) Field of Search .......................... 455/150.1, 188.1, 455/188.2, 196.1, 197.1, 255, 257, 258, 259, 264; 331/179

(56) References Cited

U.S. PATENT DOCUMENTS

| 4,881,272 A | * | 11/1989 | Eguchi | 455/143 |
|---|---|---|---|---|
| 5,428,829 A | * | 6/1995 | Osburn et al. | 455/197.1 |
| 5,892,410 A | * | 4/1999 | Peckham | 331/117 |
| 5,983,088 A | * | 11/1999 | Aschwanden | 455/188.2 |
| 6,044,251 A | * | 3/2000 | Brekelmans | 455/150.1 |
| 6,052,569 A | * | 4/2000 | Ehrhardt | 455/188.1 |

OTHER PUBLICATIONS

"New In Car Entertainment (NICE) car radio" TEA6840H Data Sheets, Philips Semiconductors.

"Up–level Car radio Analog Signal Processor (CASP)" TEA6880H Data Sheet, Philips Semiconductors.

* cited by examiner

Primary Examiner—Dwayne Bost
Assistant Examiner—Lewis G. West
(74) Attorney, Agent, or Firm—Edward W. Goodman

(57) ABSTRACT

A tuner including an oscillator, a divider means for dividing the oscillator signal and a mixer, suitable for global tuner applications, i.e. U.S.A./Europe/Japan without any hardware change, the divider is switchable between at least two values.

7 Claims, 3 Drawing Sheets

GLOBAL TUNER

BACKGROUND OF THE INVENTION

1. Field of The Invention

The invention relates to a tuner having an input for receiving an input signal, said tuner comprising an oscillator for generating an oscillator signal, dividing means for dividing the oscillator signal, and a mixer for mixing the input signal with the oscillator signal, and an output for supplying an output signal. The invention relates more particularly, but not exclusively, to a global FM tuner.

The term tuner should herein be interpreted as a tuner-integrated circuit and as a tuner-module comprising one or more integrated circuits and other discrete components.

The invention further relates to a method of a receiving an input signal, comprising the steps of generating an oscillator signal, dividing the oscillator signal, mixing the oscillator signal with the input signal and supplying an output signal.

2. Description of The Related Art

There are, for example, different standards for the FM reception bands across the world. The European and U.S. standards differ in their channel spacing and pre-emphasis, but have approximately the same frequency limits, 87.5–108 MHz in Europe and 87.9–107.9 MHz in the U.S.A. The channel spacing and band limits may be software-programmable parameters. In some stereo decoders, the de-emphasis value is, also a software-controlled parameter, for example, the CASP IC TEA6880 of Philips Semiconductors.

Therefore, no hardware change is necessary for a U.S.A./Europe FM tuner, i.e., an FM tuner which can be used in Europe and in the U.S.A.

However, this is not the case with the Japanese and Eastern European frequency bands. In Japan, the FM band ranges between 76 and 91 MHz. The oscillator frequency is set below the frequency of the requested channel to avoid TV transmission frequencies at the image position, i.e., IF=−10.7 MHz. Therefore, a global tuner would require a very large range to cover the Japanese band as well as the others; a VCO frequency range from 65.3 MHz to 118.7 MHz. As those skilled in the art know, this requires a capacitance change in the varactor diode of more than 3.3. In practice, due to stray capacitances, a capacitance ratio of more than 4 would be required.

Unfortunately, however, the tuning voltage is often limited. For example, in car radio applications, the supply voltage is only 8.5V, which can drop to 8V due to ripple and/or stabilizer tolerances in the supply lines. The saturation voltage of the known PLL charge pump further reduces the available tuning voltage to about 7.5V. However, to maintain good tracking and linearity of the tuner front-end of the receiver, the lower limit to the tuning voltage should not be far below 2V. The remaining tuning voltage range is too narrow to achieve the required capacitance change with varactor diodes in their application at these frequencies. Therefore, the standard approach is to use different components in the tuner front-end for the FM-Japan application.

The frequency of the undesired signal is referred to as image frequency or image signal.

The above problem can be solved, as has been done in the IC TEA6840 of Philips Semiconductors, by setting the oscillator to above the requested channel, also in the Japan band, which reduces the frequency range to 87.6–118.7 MHz, and by employing integrated image injection to reduce interferences by the TV transmission frequencies at the image frequencies.

The oscillator is operated at twice the required frequency to obtain, after a division by 2, a phase shift which is required to obtain an oscillator signal with a phase difference of 0 and 90 degrees.

The TEA6840 does provide a global tuner application, but still suffers from a number of drawbacks. Even with 70 dB of image rejection, FM reception in some areas in Japan is inferior when compared to receivers with the oscillator frequency below the requested channel, where there are no TV transmission frequencies at the image frequencies (as is standardized in Japan). Furthermore, the tuning voltage for the lower limit of the Japanese band is only about 1 V. This low tuning voltage reduces the third-order intermodulation performance of the tuner front-end.

This problem is even greater in the Eastern European band where the lowest tuning voltage is only 0.3V. In this case, the oscillator frequency is not required to be below the requested channel, but the reception band starts at the very low frequency of 65 MHz.

SUMMARY OF THE INVENTION

It is an object of the invention to provide a global tuner which does not have the drawbacks of the tuners described above and would further tune to the Japanese band with the oscillator below the requested channel without any hardware change and with an acceptable minimum tuning voltage. To this end, a first aspect of the invention provides a tuner as set forth in the opening paragraph, characterized in that the dividing means is switchable between at least 2 values. A second aspect of the invention provides an audio receiver comprising such a tuner. A third aspect of the invention provides a method of receiving a signal.

By using dividing means which can be switched between at least two values, it is possible to use a division by, for example, a factor of 2 for Europe and the U.S.A., and to use, for example, a factor of 3 for Japan and, for example, Eastern Europe. This makes it possible to use IF=−10.7 MHz for Japan because the division factor of 3 brings the actual oscillator frequencies, and hence the tuning voltages, to roughly the same range as the European and U.S. bands.

BRIEF DESCRIPTION OF THE DRAWINGS

The invention and additional features which may be optionally used to implement the invention to advantage will be apparent from and elucidated with reference to the embodiments described hereinafter and shown in the drawings, in which.

DESCRIPTION OF THE PREFERRED EMBODIMENTS

Figure 1:
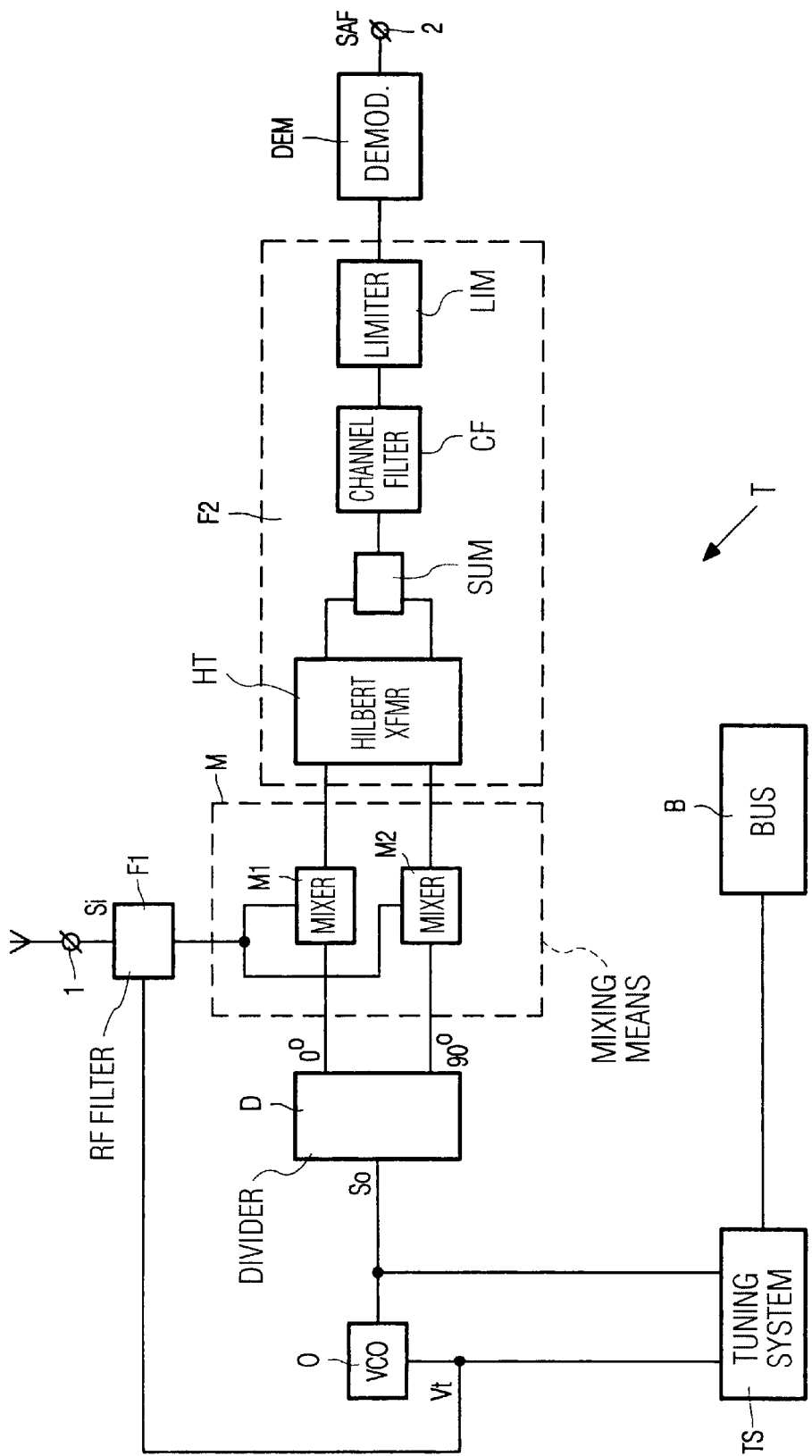
FIG. 1 shows, diagrammatically, a prior-art tuner.

FIG. 1 shows, diagrammatically, a prior-art tuner T of the TEA6840 of Philips Semiconductors. The tuner receives an FM RF signal S1 at an input 1. The input 1 is coupled via an RF filter F1 to mixing means M comprising a first and a second mixer M1 and M2. Respective other inputs of the mixers receive a signal from dividing means D having a phase difference of 90 degrees. An input of the dividing means receives an oscillator signal So from an oscillator O. In this embodiment, the oscillator O is a voltage-controlled oscillator (VCO) which receives a voltage signal Vt from a tuning system TS. This signal Vt is also supplied to the filter F1.

The tuning system TS is controlled by a bus B. The dividing means D divide the signal So by 2. The oscillator operates at twice the required frequency to obtain, after division by the dividing means by a factor of 2, a phase shift required to obtain an oscillator signal with a phase difference of 0 and 90 degrees.

The outputs form the mixing means M are coupled to a second RF filter F2 including a Hilbert Transformer HT, which supplies two output signals to a summing device SUM having a positive input and an negative input, a channel filter CF and a limiter LIM. The output of the RF filter F2 is applied to a demodulator DEM for demodulating the signal to an AF signal SAF at an output 2.

In this way, practice has proven that it is possible to achieve an overall image rejection of 70 dB.

The TEA6840 can provide a global tuner application, but still suffers from a number of drawbacks. Even with 70 dB of image rejection, FM reception in, for example, some areas of Japan is inferior when compared to receivers with the oscillator frequency below the requested channel, where there are no TV transmission frequencies at the image frequencies, as in Japan. Furthermore, the tuning voltage for the lower limit of the Japanese band is only about 1V. This low tuning voltage reduces the third-order intermodulation performance of the receiver front-end. This problem is even greater in the Eastern European band where the lowest tuning voltage is only 0.3V. In this case, the oscillator is not required to be below the requested channel, but the reception band starts at the very low frequency of 65 MHz.

The table below shows the FM frequency limits and their corresponding typical tuning voltages for the TEA6840.

| Band | Fant (MHz) | IF (MHz) | Divider | Fvco (MHz) | Vtune (V) |
| --- | --- | --- | --- | --- | --- |
| Europe | 87.5–108 | +10.7 | 2 | 196.4–237.4 | 2.3–5.5 |
| USA | 87.9–107.9 | +10.7 | 2 | 197.2–237.2 | 2.3–5.5 |
| Japan | 76–91 | +10.7 | 2 | 173.4–203.4 | 1.1–2.6 |
| Eastern E. | 65–74 | +10.7 | 2 | 151.4–169.4 | 0.3–1.1 |

Figure 2:
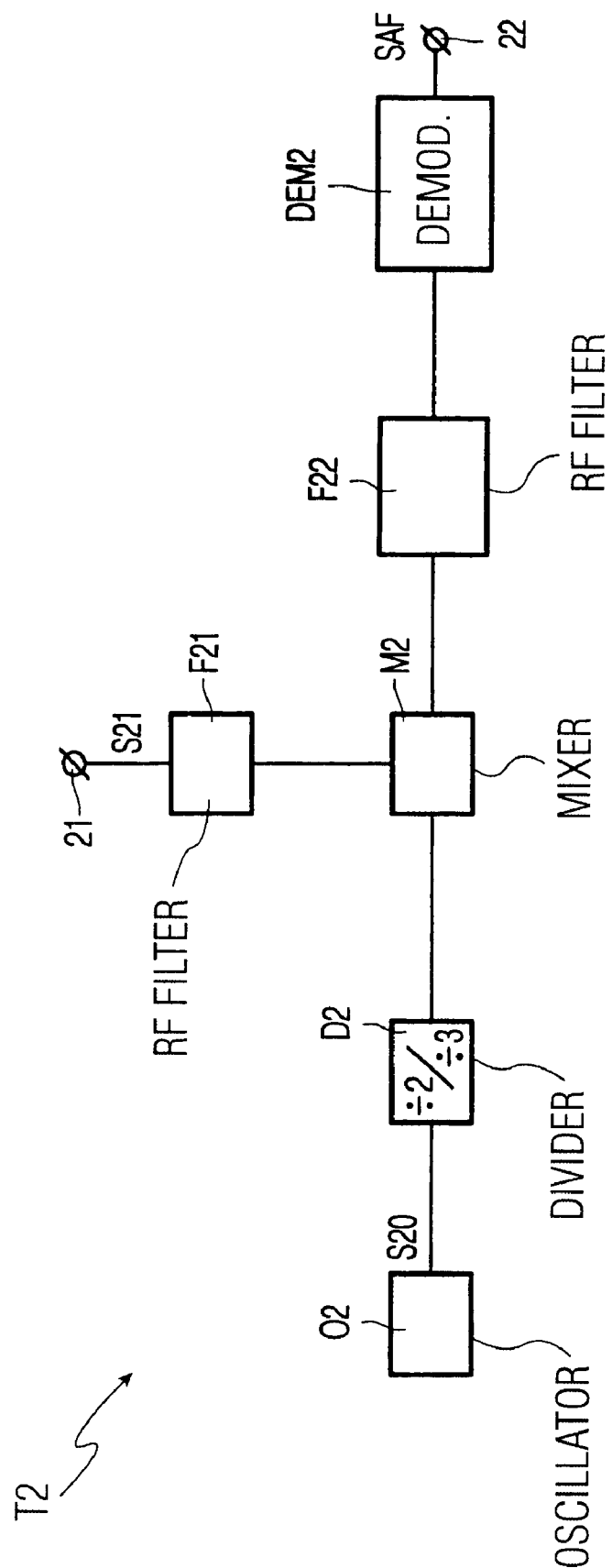
FIG. 2 shows, diagrammatically, a tuner according to the invention.

FIG. 2 shows, diagrammatically, a part of a tuner T2 according to the invention. Elements identical to those in FIG. 1 have corresponding reference symbols. An input 21 of the tuner T2 receives an FM RF signal S21. After filtering in a filter F21, the signal is supplied to a mixing means M2. The other input of the mixer receives a signal from dividing means D2. The dividing means divides a signal S20 as received at its input from an oscillator 02 by 2 or by 3.

For operation in Europe or in the U.S.A., the dividing means divides the incoming signal by 2, i.e., by the same factor as in the TEA6840.

For operation in Japan, the incoming signal of the dividing means is divided by 3. In this way, the oscillator frequencies, and hence the tuning voltages, are brought to roughly the same range as in Europe and the U.S.A.

The output of the mixing means is coupled via a filter F22, which filters the signal, to a demodulator DEM2 for demodulating the signal to an AF signal SAF and supplies this signal at an output 22.

Figure 3:
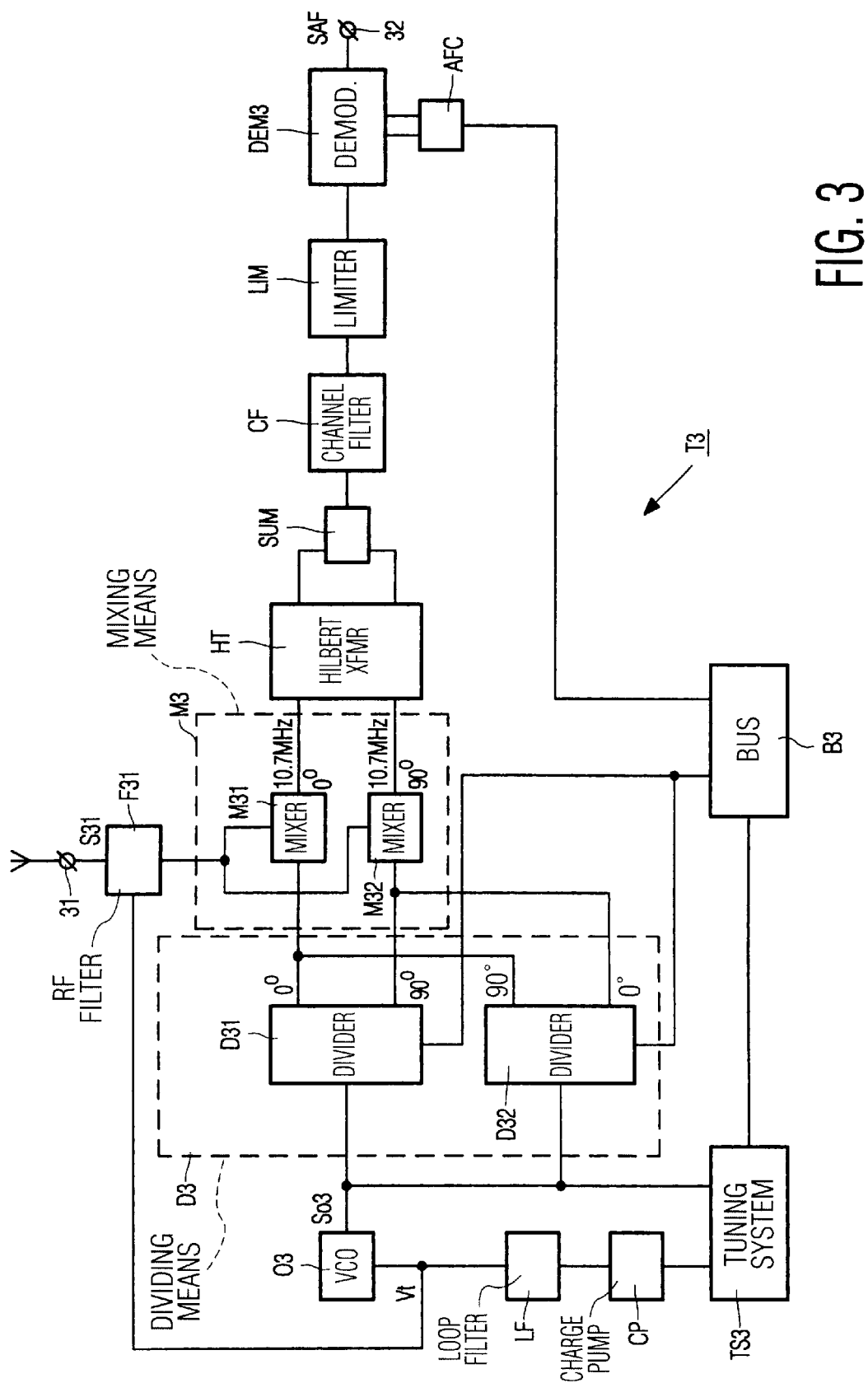
FIG. 3 shows an embodiment according to the invention in more detail.

FIG. 3 shows, in more detail, an example of a tuner T3 according to the invention. Again, an input 31 of the tuner receives an FM RF signal S31 which is supplied to a filter F31. The filtered signal is supplied to mixing means M3 having two mixers M31 and M32. Other inputs of the mixers receive two signals with a 90-degree phase difference from a dividing means D3.

In this example, the dividing means D3 comprises two dividers D31 and D32. The divider D31 divides the incoming signal from an oscillator 03 by 2 and, in operation, supplies the divided signal at the two outputs with a phase difference of 90 degrees. The other divider D32 is a divider operating on the basis of the Travelling Wave Divider principle. This divider also receives the signal from the oscillator 03 but, in operation, divides this signal by 3 instead of 2. One of the dividers is operative at a time, the divider D31 is operative in Europe and the U.S.A., and the divider D32 is operative in Japan (and also in Eastern Europe). To select the divider which has to be operative, a Bus B3 sends a signal to the dividers.

It is to be noted that the outputs of the respective dividers D31 and D32 are interchanged, i.e., the 0- and 90-degrees signals have changed places. This has to be done to make the tuner operate in Japan at IF=−10.7 MHz instead of +10.7 MHz.

In the Japan tuner application, the IF is set to −10.7 MHz by conversion from below the requested signal. But the application of the division by 3 brings the actual VCO frequency, and hence the tuning voltage, to roughly the same range as the European and U.S. frequency bands. The new VCO frequencies and their corresponding tuning voltages are given in the table below.

| Band | Fant (MHz) | IF (MHz) | Divider | Fvco (MHz) | Vtune (V) |
| --- | --- | --- | --- | --- | --- |
| Europe | 87.5–108 | +10.7 | 2 | 196.4–237.4 | 2.3–5.5 |
| USA | 87.9–107.9 | +10.7 | 2 | 197.2–237.2 | 2.3–5.5 |
| Japan | 76–91 | −10.7 | 3 | 195.9–240.9 | 2.3–5.9 |
| Eastern E. | 65–74 | +10.7 | 3 | 227.1–254.1 | 4.5–7.2 |
| Eastern E. | 65–74 | −10.7 | 3 | 162.9–189.9 | 0.7–1.9 |

The oscillator frequency supplied to the mixing means is the offset, i.e., the IF value of the requested antenna frequency (Fant), as is common knowledge in audio tuning practice. By having different division values for Europe/U.S.A. and Japan (and Eastern Europe) and, if necessary, changing IF from IF=+10.7 MHz to IF=−10.7 MHz, the tuning range can be made substantially equal for Europe/USA and Japan.

The oscillator 03 may be implemented as a voltage-controlled oscillator (VCO) which receives a tuning voltage Vt from a tuning system system T3 via a charge pump CP and a loop filter LP. The tuning system also receives the output signal from the oscillator. The tuning system TS3 is coupled to the Bus B3 to interchange information.

The mixing means M3 are implemented as quadrature mixing means to improve the filtering. The outputs of the mixing means are coupled to a so-called Hilbert Transformer HT which supplies two output signals to a summing device SUM having a positive and a negative input. The output of the summing device SUM is coupled to a demodulator DEM3 via a channel filter CF and a limiter LIM. The demodulator is coupled to the AFC circuit. As this global tuner can operate at IF=−10.7 MHz or +10.7 MHz, the AFC circuit receives the IF value which is momentarily used from the tuning system TS via the bus B3.

The demodulator DEM3 supplies a signal SAF at an output 32 of the tuner T3.

To maintain the inherent image rejection of the tuner (and the receiver), the division by 3 should provide quadrature outputs. This can be achieved in several ways. One method is the use of a standard CRL divider circuit with a 50% duty cycle and a passive phase-shift network. A simpler method is the use of the Travelling Wave Divider principle to directly synthesize the quadrature local oscillator signals. In the European and U.S. application modes, the division by 2 is operative, and the division by 3, is operative in the Japan mode.

Of course, the communication bus B3 ensures that only one divider is active at a time.

The divided quadrature oscillator combined with the Hilbert Transformator and the wideband quadrature phase shift network attenuates the image frequencies. However, when the IF frequency is changed from +10.7 MHz to −10.7 MHz, the phase references should be reversed. Otherwise, the requested signal instead of the image signal would be attenuated. This can be achieved in various ways. The simplest technique is to reverse the polarity of the division by 3 outputs with respect to the division by 2 circuit (as shown in FIG. 3). Another possibility is to reverse the polarity of one of the inputs to the summing circuit SUM. With the IF at −10.7 MHz, the output of the FM demodulator also reverses its polarity. Therefore, if an AFC circuit is employed, as in FIG. 3, the polarity should be restored. The bus B3 can be used for switching the demodulator polarity.

The novel global tuner with the division by 3 also provides new possibilities for tuning to the Eastern European frequency band. The IF=−10.7 MHz version can be implemented as shown in FIG. 3. The minimum tuning voltage range is now raised to 0.7V, which allows more room for the charge pump CP saturation voltage. The other possibility is to switch back to +10.7 MHz, which makes the minimum tuning voltage as high as 4.5 V. However, the circuit implementation would require an input polarity change at the summing circuit to maintain the image attenuation at the correct frequencies.

The idea of the invention has been described hereinbefore on the basis of some examples. Those skilled in the art will be well aware of many different solutions within the scope of the invention concerned.

The term tuner should herein be interpreted as a tuner-integrated circuit and as a tuner-module comprising one or more integrated circuits and other discrete components.

The invention may be used not only in (portable) audio receivers but also in (portable) television receivers and/or in car audio equipment, etc.

What is claimed is:

1. A tuner having an input for receiving an input signal, said tuner comprising:
    an oscillator for generating an oscillator signal;
    dividing means for dividing the oscillator signal forming a divided oscillator signal, said dividing means being switchable between at least two values as controlled by a tuning control;
    means for switching the oscillator between a positive and a negative offset;
    a mixer for mixing the input signal with the divided oscillator signal; and
    an output for supplying an output signal.

2. The tuner as claimed in claim 1, characterized in that the at least two values are 2 and 3.

3. The tuner as claimed in claim 1, characterized in that the offset of the oscillator is the IF value, said IF value being switchable between +10.7 MHz and −10.7 MHz.

4. An integrated circuit comprising the tuner as claimed in claim 1.

5. An audio receiver comprising the tuner as claimed in claim 1.

6. A method of receiving an input signal, comprising the steps:
    generating an oscillator signal;
    switchably dividing the oscillator signal between at least two values;
    switching the oscillator signal between a positive and a negative offset;
    mixing the divided oscillator signal with the input signal; and
    supplying an output signal.

7. The method as claimed in claim 6, characterized in that the at least two values are 2 and 3.

* * * * *